INVENTORS
RICHARD J. BROOKS
BURTON BROOKS

INVENTORS
RICHARD J. BROOKS
BURTON BROOKS

BY *Sherman & Shalloway*

ATTORNEYS

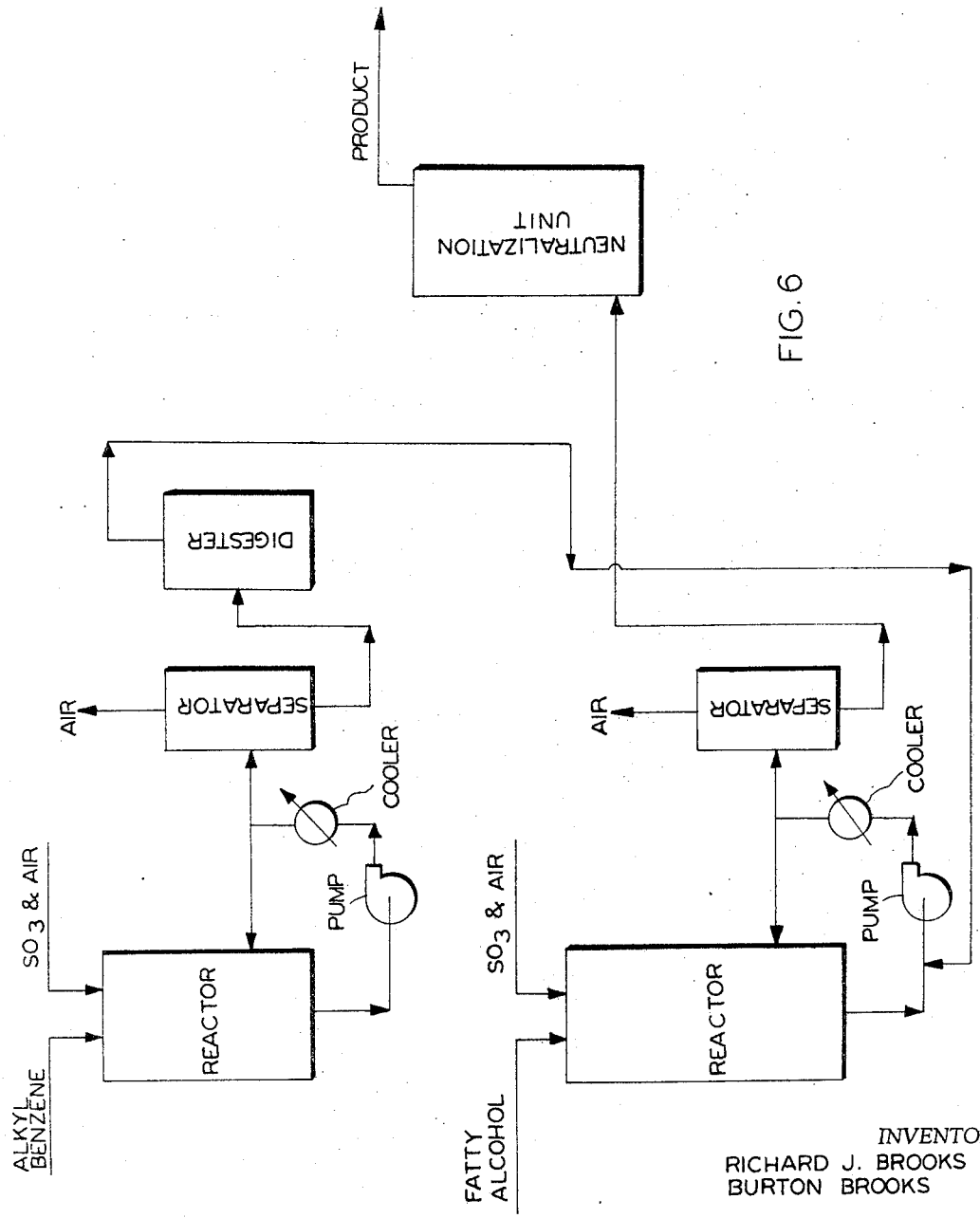

United States Patent Office 3,427,342
Patented Feb. 11, 1969

3,427,342
CONTINUOUS SULFONATION PROCESS
Richard J. Brooks and Burton Brooks, Seattle, Wash.,
assignors to Chemithon Corporation, Seattle, Wash.
Continuation of application Ser. No. 405,215, Oct. 20,
1964. This application Nov. 21, 1966, Ser. No. 596,000
U.S. Cl. 260—458                                    18 Claims
Int. Cl. C07b 13/02; C07c 143/00

ABSTRACT OF THE DISCLOSURE

A continuous process for sulfonating a sulfonatable organic reactant wherein the organic reactant is reacted with sulfur trioxide to provide a corresponding sulfonic acid which comprises passing parallel streams of said organic reactant and a mixture of sulfur trioxide and a gaseous-inert diluent into a reaction zone wherein no prereaction takes place between the stream or organic reactant and said stream of sulfur trioxide-gaseous inert diluent prior to entry into said reaction zone, thoroughly mixing said organic reactant and said sulfur trioxide-gaseous inert diluent in said reaction zone and rapidly cooling the resultant reaction mixture as it passes from the reaction zone, said reaction zone consisting of two externally cooled, substantially concentric, circular reaction surfaces.

---

This application is a continuation of application Ser. No. 405,215, filed Oct. 20, 1964, and now abandoned, which in turn is a continuation-in-part of application Ser. No. 244,096, filed Dec. 12, 1962 and application Ser. No. 320,301, filed Oct. 31, 1963.

This invention relates to a process and apparatus for the sulfonation of organic reactants, and relates more particularly to an improved process and apparatus for the rapid and continuous sulfonation of alkyl aryl hydrocarbons, fatty alcohols, ethoxylated fatty alcohols, ethoxylated alkyl phenols and other sulfonatable organic compounds.

The term "sulfonating," as employed hereinafter in the specification and in the claims, is used sometimes in its generic sense as applying both to true sulfonating and to sulfating, and sometimes in its specific sense, that is to true sulfonating. Where the context in which the term "sulfonating" is used does not require the specifice sense, it is to be construed generically.

Organic sulfonic acids and organic sulfonates are becoming increasingly important due to their use in the preparation of liquid detergents, particularly in the preparation of relatively salt-free detergents having good solubility characteristics. These sulfonated detergents usually have been prepared by sulfonation processes employing concentrated sulfuric acid or oleum. In such processes the reaction mixture contains a residue of sulfuric acid and water as a byproduct. Unless special techniques are followed, the separation of the desired reaction product from the final reaction mixture is extremely difficult. Because of the presence of residual sulfuric acid in the final reaction mixture, neutralization of the so-formed sulfonated product with, for example, sodium hydroxide also results in the formation of sodium sulfate. The presence of sodium sulfate is often undesirable, particularly in the preparation of salt-free detergents having good solubility characteristics. In the preparation of such detergents, any sodium sulfate present must be removed.

For these resasons and because, in many countries of the world, oleum is in short supply and disposition of spent acid presents a major problem, the use of sulfur trioxide as the sulfonating agent has been studied. Earlier efforts to develop a sulfur trioxide/air sulfonation process were unsatisfactory in that a yellow or brown colored detergent was generally obtained. Such a discolored product required bleaching in order to compete with the products obtained by oleum sulfonation, the bleaching step adding considerably to the cost of the final product. Moreover, the resultant bleached product was still substantially inferior in both color and quality to the sulfonates produced by the prior art processes employing oleum.

Gilbert, in U.S. Patent No. 2,723,990, describes a method for sulfur trioxide sulfonation using a batch system, wherein a heel of sulfuric acid is added to lower the viscosity of the organic reactant, after which the sulfur trioxide, mixed with air in a concentration of about 5%, is introduced. The difficulty with this system is that the heel of sulfuric acid, to a great extent, overcomes the advantage of the sulfur trioxide process, namely, obtaining a substantially salt-free product.

Other disadvantages encountered when employing a batch system for producing organic sulfonates are the inherent difficulties in agitation and/or temperature control. Many attempts have been made to modify the batch system to overcome these deficiencies. For example, one method formerly employed was to cause a tank containing a sulfonation reaction mixture to overflow into a series of tanks in order to provide a semi-continuous sulfonation process. The results, however, were not entirely satisfactory in that the quality and yield of the product varied, and/or a product of good color characteristics was not obtained.

Thus, prior to the instant invention and those described in our prior applications, it generally has not been considered commercially practicable to develop a fully continuous sulfonation process wherein a high degree of product purity as well as optimum yields of product could be obtained.

It is therefore a principal object of this invention to provide a continuous process and a novel apparatus for the sulfonation of organic reactants which are free from the disadvantages of the prior art processes and apparatus.

Another object of the present invention is to provide a rapid and fully continuous process for the sulfonation of alkyl aryl hydrocarbons, fatty alcohols and other sulfonatable organic materials.

A further object of the present invention is to provide a novel apparatus for carrying out the processes of the invention and other gas-liquid reactions.

A still further object of the present invention is to provide a novel gas-liquid reactor for carrying out the processes of the present invention.

Still another object of the present invention is to provide a fully continuous sulfonation process in which there is very little hold-up time in the processing equipment employed.

A still further object of the present invention is to provide a fully continuous sulfonation process which is adapted to be carried out in processing equipment that is simple to control and requires relatively small plant space.

An odditional object of the present invention is to provide a fully continuous sulfonation process wherein a sulfonated product is prepared which easily can be separated from the product mixture obtained.

Yet another object of the present invention is to provide a fully continuous sulfonation process wherein a substantially salt-free sulfonated product is obtained in relatively high yield.

Still an additional object of the present invention is to provide a fully continuous sulfonation process wherein a sulfonated product of excellent and uniform quality is obtained in commercially attractive yields.

A particular object of the present invention is to provide a fully continuous sulfonation process which yields a sulfonated product of good color, odor and purity and which requires no bleaching.

The above-mentioned and other objects and advantages of the present invention will become apparent as the invention is more thoroughly discussed hereinafter.

Broadly described, the present invention provides a continuous process for sulfonating a sulfonatable organic reactant, preferably an organic reactant selected from the group consisting of compounds having an olefinic linkage, compounds having an aromatic nucleous, and compounds having an alcoholic hydroxylic group, wherein said organic reactant is reacted with sulfur trioxide to provide a corresponding sulfonic acid, which comprises passing parallel streams of said organic reactant and of a mixture of sulfur trixodie and a gaseous inert diluent into a reaction zone and rapidly cooling the resultant reaction mixture as it passes from the reaction zone, said reaction zone consisting of two externally cooled, substantially concentric, circular reaction surfaces and having a concentrically located rotor turning therein, the space between the said reaction surfaces being one-eighth to one-half inch and the clearance between the said rotor and the said reaction surfaces being five to forty thousandths (.005 to .040) of an inch.

This invention also contemplates embodiments of the above-described process wherein, subsequent to the rapid cooling of the sulfonic acid-rich reaction mixture the inert diluent gas and unreacted sulfur trioxide are separated therefrom. The resultant mixture is passed to and maintained for an additional period of time in a digestion zone while being agitated without substantial back-mixing, to substantially complete the reaction.

Also broadly described, this invention provides an apparatus for the reaction of a liquid with a gas which comprises: two externally cooled, substantially concentric, circular reaction surfaces, the space between said reaction surfaces being one-eighth to one-half inch; a rotor located concentrically between the two said reaction surfaces, the clearance between the said rotor and the said reaction surfaces being five to forty thousandths (.005 to .040) of an inch; means for turning the rotor; and means for passing the reactant liquid and the reactant gas in parallel streams to the space between the said reaction surfaces and the said rotor.

The following is a general description of the apparatus and process of the invention: The reactor consists essentially of two externally-cooled, stationary, circular, concentric, reaction surfaces and a rotor turning in the space between the reaction surfaces. The reaction takes place on these surfaces and in the annulus between the two surfaces. The liquid reactant is fed to each surface and the gaseous reactant is fed to the annulus between the surfaces. The rotor turns only in a portion of the space between the two surfaces and does not extend the entire length of the reactor. The rotor has a short solid skirt which serves as a distribution system for feeding the outside wall of the two concentric surfaces. The liquid reactant is usually fed to the top of the rotor and is distributed to the outside surface of the reactor walls by means of the rotating movement of the rotor. In one embodiemnt of this invention, the spinning rotor can also distribute the liquid reactant to the inner surface of the reactor by means of properly sized and placed holes or tubes which terminate very close to the inner surface. Below the solid skirt of the rotor are open veins positioned at an angle. When the veins are inclined at acute angles to the vertical axis, such as about 45°, better distribution of the liquid reactant over the reaction surfaces is accomplished and less material adheres to the rotor. When the veins are parallel to the axis of the rotor, the reaction product in an oxidation reaction may be charred on the lee side of the rotor vein.

Because the liquid reactant enters the reactor through narrow slits and small holes concentric with the reaction surfaces, no opportunity is afforded for the pre-reaction with the gaseous reactant before entering the reaction zone proper. For this reason, it has not been found necessary in the process of the instant invention to feed a large volume of gaseous diluent, such as air, with the entering liquid organic reactant, but some air can be fed with the liquid reactant in order to increase its liquid injection velocity and minimize over-reaction at the point of contact with the gaseous reactant.

The liquid reactant can also be fed to the inner reactor surface through a distribution system in which a rough distribution is first made, and then fed through a ring which has a very small gap around the circumference of the inside pipe. In some cases, this gap can be increased as some of the product produced in the reaction is recycled, increasing the volume and quantity of material which is fed to the wall, or some air can be employed as mentioned above.

The main purpose of the rotor is to distribute the reacting liquid on the inner and outer reaction surfaces. It is very important that all surfaces be wetted. Moreover, it is important that there be uniform distribution of the reactant over the entire reaction surface. If there is not uniform distribution to all parts of the reaction surface, there may be over-reaction on some portions and under-reaction on other portions of the reactor. When the liquid reactant film on a reaction surface is contacted with a high velocity gaseous reactant, liquid is torn from the wall surface and is intercepted by the turning rotor and returned to a wall reaction surface, where the heat of reaction is more rapidly removed. The rotor also has the effect of redistributing the partially reacted liquid over the reaction surface. The rotor also causes turn-over of the partially reacted liquid, thereby eliminating the possibility of over-reaction of the surface portion of the liquid and preventing the build-up of charred reaction products. Without the rotor present in an oxidation reaction, there is a tendency for carbonaceous material to build up due to over-reaction in given areas. This material, after building upon the wall, prevents uniform distribution of the liquid reactant as it goes down the wall of the reactor. Such poor distribution then leads to further poorer reaction, so that the mechanism builds upon itself. The rotor, in creating better distribution on the reaction surface and turning over the film, enhances the rate of reaction, so that the reaction takes place in a much shorter length of time.

The specific nature of the system employed for distributing the liquid reactant on the reactor surfaces may take many forms, but the important result that must be accomplished is that the reactant must be uniformly distributed around the circumference in a thin film without pre-mixing with the gaseous reactant before distribution has been accomplished. These beneficial results are obtained when the reactants are fed to the reactor in parallel concentric streams. Also, the rotor should approach each concentric reaction surface (inside and outside) not closer than five thousandths (.005) and at most about forty thousandths (.040) of an inch, the space between the two reaction surfaces being one-eighth to one-half inch.

It has been found that a reaction tube length of about three feet is adequate for sulfonation of the liquid reactant because about 80 to 95% of the desired reaction takes place in the first 6 or 8 inches underneath the rotor when the clearance between the two concentric reactor surfaces is about one-quarter inch and the velocity of the sulfur trioxide-inert gas mixture is between 200 and 300 feet per second. As the distance between the two concentric reaction surfaces becomes greater, a longer reaction tube length is required along with a higher velocity of the gaseous reactant. For example, when the distance varies between three-eighths and one-half inch, the reactor needs to be about 10 feet long. On the other hand, when the space between the reaction surfaces is smaller, a shorter reaction length and lower gas velocity may be employed.

Referring specifically to the sulfonation of a liquid organic reactant by means of a sulfur trioxide-air mixture, the action of the high velocity gas mixture alternately removes the liquid reactant from one reaction surface, suspends it in the space between the reaction surfaces and then redeposits it on a reaction surface. This results in the liquid reactant being transferred rapidly back and forth from one reaction surface to another. Because a high percentage of the reaction takes place underneath the rotor, the concentration of sulfur trioxide is very low in the gas mixture in the space below the rotor. Thus, the reaction can proceed to nearly complete absorption of sulfur trioxide without severe degradation of the liquid reactant and/or sulfonic acid product, below the mechanically agitated surface.

As the reaction mixture, containing sulfur trioxide, liquid reactant, and sulfonic acid, product leaves the reactor, virtually all of the sulfur trioxide has been absorbed. Some of this absorption, however, is in the form of anhydrides or other polymerized forms of organic material. These anhydrides will decompose with time or react directly with unreacted reactant. This action takes place both in the quench cooler and in the digestion system. As the liquid leaves the reactor, the reaction is about 94 to 95% completed when sulfonating, for example, dodecyl benzene. When leaving the cooling system, the reaction is nearly 98% completed. The final portion of the reaction takes place in the digester.

It is important that the two reaction surfaces be nearly concentric to help insure uniform distribution of the sulfur trioxide. If the two reaction surfaces are not concentric, a greater quantity of the reactant gas will pass on the side having a larger area. Since the liquid organic reactant is uniformly distributed around the reaction surfaces, a greater quantity of sulfur trioxide will then contact the reactant on one side than it will on the other side. While it is important that the distribution of the reactant be uniform around each surface, it is not necessary that an exactly equal amount of reactant be fed both to the inner and the outer surface because the liquid transfers rapidly from one reaction surface to the other. In fact, it appears to be advantageous in some cases to feed a slightly larger quantity of liquid reactant to the inner surface, where it is then transferred through centrifugal force of the rotor to the outer surface.

Where a short length reactor is used, it is necessary that a rapid cooling system be employed to cool the product acid. When a longer reactor is employed, the additional cooling surface replaces the rapid cooling system but at the expense of time. The more rapid cooling can be accomplished by recycling a quantity of the reaction product through a heat exchanger and contacting it with the fresh, hot reaction product near the bottom of the reactor. Rapid cooling can also be accomplished by passing the reaction product through a large heat exchanger of short length, so that the cooling takes place in a much shorter length of time than if it were taking place on the reaction surfaces. Of the two cooling systems, the preferred system is the recycling of the cooled acid.

An additional advantage of the recycle cooling system is that it allows for the installation of parallel reactors which empty into a common cooling system. The sulfur trioxide-air mixture is split into more than one stream when using parallel reactors with a single source of sulfur trioxide. In so doing, it is not always possible to precisely split each stream to contain exactly the same amount of reactant. This will give a slight degree of variation in the degree of conversion in each of the parallel reactors. However, since all of the sulfur trioxide is absorbed in the reaction product as discussed above, this reaction product is then capable of reacting with additional liquid reactant as previously explained. Since the effluent from each reactor discharges into a common recycle bath, this system can be used for smoothing out the degree of reaction in each of the parallel reactors. It will do this without any appreciable production of color in the product because of the instantaneous cooling which takes place at the end of each reactor and because the concentration of the absorbed or dissolved sulfur trioxide is rapidly reduced by reaction with unreacted liquid reactant present in the recycle system. This system works whether the reaction is a sulfonation reaction as with alkyl benzene or a sulfation reaction, for example, with lauryl alcohol.

When only one reactor is utilized for the entire reaction, the heat of reaction gives rise to an instantaneously high temperature in the reaction zone. In spite of the high temperature, little harm is done to the product if it is rapidly cooled on leaving the reaction zone. Although only one reactor is required to make high quality product from most raw materials, the use of reactors in series can be beneficial when reacting more temperature-sensitive raw materials.

Cooling of the reaction surfaces is brought about by jacketing each reaction surface and passing water through the jackets. When it is desired to have one surface or a portion of a surface at different temperature than another, the cooling surfaces may be divided into several sections. Thus, a higher or lower temperature water may be passed through the various portions of the reaction zone as necessary or desired. Baffles may be provided in the cooling jackets in order to provide better distribution of the cooling water and more even temperature control.

The sulfur trioxide-air gas mixture enters the reactor at the bottom and passes up through the inside of the inner reaction surface and enters the reaction zone underneath the top of the rotor, and then, changing direction, passes downward parallel to the direction of flow of the liquid reactants on each surface. When the entering gas mixture is warmer than the water being employed in cooling the reaction surfaces, an insulating layer should be provided so that the cooling water surface and the entering gas mixture do not exchange heat with each other. The insulating layer is not necessary in those instances where the cooling water and entering gas mixture are nearly the same temperature.

The process of the present invention contemplates the use of any organic reactant which is reactive with sulfur trioxide to provide a sulfonated product. The method of the present invention is particularly applicable to the sulfonation of organic compounds which contain an aromatic nucleus, organic compounds which contain an olefinic linkage, and organic compounds which contain an alcoholic hydroxyl group. Such sulfonatable organic compounds utilized in the invention include, without limitation, olefins containing from about 8 to about 20 carbon atoms, such as octene, decene, dodecene, tetradecene, hexadecene, octadecene, eicosene, tetradecadiene, and octadecadiene; olefinically unsaturated acids such as oleic acid and linoleic acid; fatty alcohols containing from 8 to about 20 carbon atoms, such as octyl alcohol, decyl alcohol, lauryl alcohol, tridecyl alcohol, tetradecyl alcohol, cetyl alcohol, tallow alcohol, octadecyl alcohol, and eicosyl alcohol; ethoxylated derivatives of the above fatty alcohols, such as polyoxyethylene ethers of lauryl alcohol and tridecyl alcohol; ethoxylated derivatives of alkyl phenols wherein the alkyl group contains from about 8 to about 16 carbon atoms, such as nonylphenyl polyoxyethylene ethers; ethyoxylated derivatives of partial esters of polyhydric alcohols such as polyoxyethylene ethers of luaric acid partial esters of sorbitol; and monocyclic and polycyclic aromatic hydrocarbons and alkyl substituted derivatives thereof wherein the alkyl group contains up to about 20 carbon atoms, such as benzene, biphenyl, naphthalene, toluene, xylene, ethyl benzene, propyl benzene, butyl benzene, dibutyl benzene, hexyl benzene, oxtyl benzene, nonyl benzene, decyl benzene, dodecyl benzene, tridecyl benzene, tetradecyl benzene, hexadecyl benzene, octadebyl benzene, nonyl toluene, decyl toluene, dodecyl toluene, tetradecyl toluene, dodecyl xylene, dodecyl ethyl benzene, dodecyl isopropyl benzene, methyl biphenyl, ethyl biphenyl, propyl biphenyl, butyl biphenyl, dipropyl biphenyl, tetradecyl biphenyl, octadecyl biphenyl, dodecyl methyl biphenyl, isopropyl tetradecyl biphenyl, methyl naphthalene, ethyl naphthalene, isopropyl naphthalene, butyl naphthalene, diisopropyl naphthalene, dibutyl naphthalene, hexyl naphthalene, octyl naphthalene, decyl naphthalene, tetradecyl naphthalene, octadecyl naphthalene, dodecyl methyl naphthalene, ethyl tetradecyl naphthalene, and the like.

As the organic reactant, the invention also contemplates the utilization of sulfonatable organic compounds which themselves or precursors thereof have been subjected to a preliminary sulfonation treatment whereby double or polysulfonated products are produced.

The alkyl benzenes which are preferred for utilization in the practice of the present invention are well known in the art and can be conveniently represented by the formula

wherein R is an alkyl radical, either straight or branched chain, containing at least 8 carbon atoms, and preferably from 8 to 20 carbon atoms. Such alkyl benzenes and their preparation are disclosed in a large number of U.S. patents, illustrative of which are U.S. Patent Nos. 1,992,160; 2,161,173; 2,210,902; 2,218,472; 2,223,364; 2,220,099; and 2,597,834.

Sulfur trioxide for use in the process of the present invention may be made in any conventional manner. Examples of methods of preparation would include burning sulfur and catalytically oxidizing the resulting sulfur dioxide to sulfur trioxide, and thereafter feeding the resultant sulfur trioxide/air mixture directly to the organic reactant to sulfonate the latter. Also, a side stream of converter gas from a sulfuric acid manufacturing plant may be metered and utilized as the sulfonating agent for the organic reactant. Also, sulfur trioxide can be prepared by stripping it from concentrated oleum. Stabilized liquid sulfur trioxide is also useful in the practice of the present invention. The sulfur trioxide used in the process of the present invention is diluted with inert gas such as air, nitrogen, carbon dioxide, etc. By inert gas is meant a gas substantially unreactive during the course of the sulfonation reaction.

In accordance with the instant invention, the sulfur trioxide enters the reaction system under pressure in a controlled stream of inert diluent which gives it added velocity, and at the same time the concentration of the entering sulfur trioxide is also controlled, preferably from about 2% to about 8% by volume. The pressure at which the reactants enter the system is also of importance because as the back pressure of the entering reactants increases, the reactivity of the sulfur trioxide gas also increases. However, in the present invention a relatively low pressure is required for passage of the sulfur trioxide/inert diluent mixture through the system. The sulfur trioxide/inert diluent stream generally enters the system under a pressure ranging up to about 75 p.s.i.g., preferably from 10 to about 15 p.s.i.g. It has been found that pressures above 75 p.s.i.g. are increasingly harmful to the final product quality. Also, the velocity of the sulfur trioxide/inert diluent stream should be at least about 75 and up to about 300 feet per second.

The amount of sulfur trioxide employed is also an important factor in the present invention, particularly with regard to the specific classes of materials which can be sulfonated. For example, when substituted aromatics are employed, e.g., dodecyl benzene, as the material to be sulfonated, generally an excess, preferably 8 to 10 mole percent excess, of sulfur trioxide is employed. However, when utilizing tridecyl benzene, which does not sulfonate as completely or as readily as dodecyl benzene, a somewhat greater mole excess preferably is used, e.g., a 8 to 15 mole percent excess. A fatty alcohol, when used as the organic reactant, degrades quite easily when side reactions take place; accordingly, it is preferred to utilize from about 15% mole deficiency to about a 6 mole percent excess of sulfur trioxide. When sulfonating straight chain dodecyl or tridecyl benzene a 6 to 8 mole percent excess of $SO_3$ is employed.

Xylene and toluene present a different problem, for these materials form sulfones and the larger the excess of sulfur trioxides used, the more sulfone formation takes place. In order to avoid sulfone formation, it is essential that the sulfonation take place with a deficiency of sulfur trioxide, e.g., about 60% sulfur trioxode based on the moles of hydrocarbon feed. The unreacted xylene and toluene may be extracted and recycled back through the process.

Non-ionics such as ethoxylated nonyl phenol present another problem when they are being sulfonated. Thus, it is possible to sulfate or sulfonate this type of non-ionic on the ring, but ring sulfonates are not as desirable as detergents. Therefore, in accordance with the instant invention, ring sulfonation is to be avoided. Accordingly, with non-ionics the amount of sulfur trioxide employed should be between a 5% deficiency and about 6 percent excess, depending upon the particular non-ionic.

In accordance with the method of the present invention, the sulfur trioxide/inert diluent mixture is introduced into the reaction zone at a temperature which generally is somewhat lower than the average temperature of the reaction mixture in the reaction zone. In the preferred embodiments of the invention, the temperature of the sulfur trioxide/inert diluent mixture is in the range of from about 90° to about 125° F.

Another factor that has caused poor product color in previous sulfonation processes has been the presence of sulfuric acid and/or sulfur trioxide mist in the gaseous sulfur trioxide sulfonation agent when it enters the reactor. This mist can be formed by small traces of moisture present in the inert diluent which react with the sulfur trioxide upon the mixing thereof to form sulfuric acid droplets if the mixture is allowed to cool to too low a temperature. In the instant process, any mist present preferably is removed from the sulfur trioxide/inert diluent stream prior to its introduction into the reactor.

Another feature of this invention which has been found to give a more completely pure sulfonated product is the introduction of the reactants into the process at as low a temperature as possible consistent with obtaining adequate mixing, since the lower the temperature of the reaction the better the quality of the final product. In order to maintain optimum conditions throughout each stage of the process, the reaction between the sulfur trioxide and the reactants should take place at as low a temperature as possible until the viscosity of the reactants starts to rise to a high value. When this increased viscosity occurs, the temperature is permitted to rise, keeping the viscosity at a fairly constant value.

With regard to the actual feed temperatures of the organic reactants used in the process of the instant invention, it is generally preferred to provide the organic reactant at the lowest practical temperature consistent with its being in liquid form. Accordingly, when an alkyl benzene is employed as the reactant, i.e., the material to be sulfonated, the temperature of the material added to the reaction zone may be as low as 0° F. Other aromatics and aromatic-containing compounds, such as benzene, toluene, xylene, and the like, may be precooled to temperatures similar to that employed for alkyl benzene, if desired. When using a fatty alcohol as the organic reactant, such as, for example, lauryl alcohol, which is solid at room temperature, it must be heated to a temperature of about 85° F. whereby the reactant will be melted. Tallow alcohol, when employed, may have to be heated somewhat higher, for example, up to a temperature of about 135° F. Furthermore, when a non-ionic, which is liquid at room temperature but very viscous, is employed, it has to be warmed somewhat, for example, up to a temperature of 90° F., and maintained at a constant temperature so that when it is metered to the reaction zone through a flowmeter, the metering is always accurate. In the process of this invention it was found useful to use a temperature controlled storage tank for each of the organic reactants so that they will always be fed to the reaction zone at a constant temperature.

When temperature sensitive materials such as certain fatty alcohols are being sulfated, it is beneficial in some cases to recycle a small amount of cooled reaction acid from the bottom of the cooler, back to the incoming fatty alcohol. Normally, this procedure is not required with good grade fatty alcohols or ethoxylates. With certain secondary alcohols, olefins and the like, where side reactions are possible, then recycling may show a beneficial effect.

One of the major problems present in the prior art sulfonation processes has been the inability to control the viscosity of the products at various stages of reaction, with the result that poor product color and low purity were always evidenced in the final product due to the inability to adequately mix the sulfur trioxide with the product. However, this problem has been obviated in the instant process by employing adequately high temperatures to control viscosity during the introduction of the reaction mixture into the reaction zone, coupled with thorough and effective mixing therein, and thereafter instantly cooling the reaction mixture. The viscosity of the product-reactant mixtures in the process of this invention is reduced at the higher temperatures, and mixing is more efficient when the reactants come in contact with the sulfur trioxide. Thus, the problem of controlling the viscosity of the reactants is directly related to the temperature of reaction, which temperature, in turn, is partially based upon the quantity of fresh reactants used in the reaction and the temperature at which the reactants enter the reaction zone. Generally speaking, it is desirable to sulfonate at as low a temperature as possible, consistent with keeping the viscosity low enough to get extremely good mixing. Different materials have different viscosities as the reaction progresses, and require different operating temperatures. Fatty alcohols, for example, lauryl and tallow, when sulfated have little viscosity increase as the reaction progresses. Alkyl benzene, on the other hand, can be introduced at much lower temperatures due to its low melting point, but its viscosity rises excessively as the reaction progresses.

Using the apparatus of the present invention, when the sulfur trioxide-air mixture contacts the film of organic liquid, the reaction is very rapid and there is an immediate temperature rise. Although the point temperature conditions of the reacting molecules may be higher than 300° F., the heat transfer rate to surrounding molecules of gas and liquid is very rapid and the average temperature in the first section of the reactor under the rotor is normally 200° to 250° F. Since approximately 90% of the reaction occurs in the rotor sections of the reactor, the maximum temperature occurs in this zone. In the remaining section of the reactor, the heat loss to the cooling jacket is greater than the heat of reaction and the temperature drops. The temperature at the bottom of the reactor, before the cooling zone, is approximately 150° F. to 200° F.

In standard sulfonation equipment, reaction temperatures of this magnitude would cause severe oxidation or burning of the product; but in the present apparatus, the gas velocity is great enough to transport the liquid film and liquid mist through the reactor in such a short period of time that this does no occur. In fact, the high temperature is actually beneficial in that it reduces the viscosity of the liquid film, thereby resulting in increased turbulence, a thiner film, and more rapid transport through the reactor.

The maximum temperature in the agitated zone of the reactor can be lowered by pre-cooling the liquid reactant, by introducing a recycle of cooled reacted material along with the reactant, or by using more than one reactor with cooling between stages. These approaches are required only when using raw materials which undergo undesirable side reactions when contacted with sulfur trioxide in the standard manner. It has been found that lowering the reaction zone temperature by any or all of the above methods will minimize these side reactions. Examples of materials which are benefited by lower temperatures are xylene, toluene, alpha olefins, secondary alcohols, and ethoxylated secondary alcohols. The optimum reaction temperature depends on the viscosity of each raw material since too low a temperature will result in poor mixing of the reactant with sulfur trioxide.

Thus, in practicing the process of the present invention, it is very important to have the temperature of the reactants sufficiently high for a very short period of time prior to the rapid cooling step so that excellent mixing can take place due to the lowered viscosity of the reactants. For example, a maximum temperature of around 120° F. to 130° F. is usually specified in the prior art for the sulfonation of an alkyl benzene having from 8 to 20 carbon atoms in the side chain. When operating at this temperature, the sulfonate formed is extremely viscous and the known methods of agitation are entirely inadequate to obtain high product quality with this material. In contradistinction to the known methods employed in the prior art, the instant process, when using an alkyl benzene as the reactant, requires that it be introduced into the reaction zone at a temperature which is relatively low, that the temperature be allowed to rise instantly to a maximum during the few seconds that the material is in the reactor, and that the reaction mixture thereby formed then immediately be cooled. Thus the alkyl benzene will be introduced at ambient temperatures and its temperature will be about 150° to 200° F. during the few seconds that it is in the reaction zone. Then, after vigorous mixing for a second or two at temperatures above 150° F., the material is immediately cooled to a temperature of about 120° F. It has been found that for optimum results to be achieved the temperature of the reaction must be controlled above about 150° F. after the reaction of the alkyl benzene is about 60% complete. Little evidence of degradation is found in the resultant product.

Control of the cooling water temperature is critical in controlling the course of the reaction. It is extremely important that a cooling water temperature be employed that will not freeze or solidfy the reaction mixture or the product on the cooling surface, thereby subjecting it over and over to reaction with the sulfur trioxide-air mixture. With many reactants, the freezing point or solidification temperature rises as sulfonation begins to a point somewhat above that of the melting point of the reactant, as in the case of fatty alcohols, and then as sulfonation proceeds further, the freezing point drops substantially below that of the original alcohol reactant. It is very important, especially in the initial stages of the reaction, that cooling water be employed at a temperature sufficiently high to keep the reaction mixture in the liquid state.

To illustrate, when a fatty alcohol first beings to react, the freezing point temperature rises until about 25% of the sulfonation has been completed. Warmer water should be employed during this portion of the reaction. The freezing point can be lowered somewhat by recycling a portion of completely reacted sulfonic acid product from the bottom of the reactor and mixing it with the incoming alcohol feed at the top of the reactor. If an adequate quantity of product is mixed with the alcohol, cooling water at a much lower temperature can be employed and the reaction can be carried out at a lower temperature.

When sulfonating dodecyl benzene, cooling water of 85° to 90° F. is employed. With lauryl alcohol, a temperature of 90° F. is employed; with tallow alcohol, a temperature of 130° F. is employed; and with ethoxylated lauryl alcohol, a temperature of 90° F. is employed. In general, with the fatty alcohols a cooling water temperature of about 5° to 10° F. higher than the melting point of the alcohol is employed. With very viscous materials which do no freeze, warmer cooling water is employed to thin the reaction film.

It previously has been pointed out that the reactants, on entering the reactor, instantaneously reach a fairly high temperature. The reactants and resultant product are cooled as they progress down the reactor and are rapidly cooled at the bottom or cooling zone. The cooling zone temperatures will depend upon the freezing point of the organic sulfuric or sulfonic acid or its viscosity. If the material freezes, as do the fatty alcohols, the cooling temperature is approximately 5 to 10° F. higher than the freezing point. With viscous materials which require digestion, such as alkyl benzene sulfonic acid, the material is cooled to a low enough temperature so that there is a minimum of color degradation during digestion, but sufficiently high to insure near complete reaction of the undecomposed anhydride with the unreacted alkyl benzene.

The residence time of the liquid reaction mixture in the reactor is in the range of from about 0.03 second to about 10 seconds, and preferably from about 0.1 second to about 1 second. However, with very fluid reactants, it is possible for the residence time to approach that of the gas stream. Extensive tests have disclosed that if the liquid reaction mixture is in the reactor for a longer period of time than indicated or for the period of time indicated without being cooled immediately at the end of this time period, product degradation takes place. The residence time of the main gas stream in the reactor is much less than that of the liquid reaction mixture. The actual superficial gas velocity of the sulfur trioxide/inert diluent mixture employed varies from about 75 to about 300 feet per second. This gives the gaseous reactant a residence time of only about 0.01 to 0.05 second in the reactor.

In accordance with the method of the present invention, at the end of the above-described residence period of the reaction mixture in the reaction zone, the resultant reaction mixture is removed from the reaction zone and rapidly cooled, i.e., within a matter of seconds, in a cooling zone to prevent degradation of sulfonation products present. The rapid cooling may be carried out in any suitable manner, such as by immediately passing the materials into a relatively cool mass of product sulfonic acid corresponding to that present in the reaction mixture, whereby the reaction mixture is quench cooled, or by immediately passing the reaction mixture rapidly through a heat exchanger wherein it contacts a large cooling surface which effects a rapid reduction in the temperature of the mixture. Preferably, the rapid cooling is carried out by means of a quench cooling technique including efficient mixing of the two bodies of liquid.

The actual temperature to which the reaction mixture from the reaction zone must be cooled in the cooling zone in a particular case is that requisite to prevent product degradation from occurring and, hence, varies depending upon, inter alia, the particular organic reactant employed, the amount of sulfonating agent employed, the reaction zone exit temperature of the reaction mixture, and the residence time of the reaction mixture in the reaction zone. Usually the reaction mixture is cooled to a temperature of below about 140° F. and preferably in the range of from about 80 to about 125° F.

In preferred embodiments of the method, wherein the cooling step is carried out utilizing a quenching bath in the cooling zone, the temperature and relative amount of product sulfonic acid coolant employed in the quench cooling zone is such that a sufficient mass thereof is present whereby the reaction mixture is drowned when contacted therewith to effect substantially instantaneously, i.e., within a matter of seconds, the requisite cooling of the reaction mixture. In accordance with the more preferred embodiments of the present invention, the product sulfonic acid cooling mass has a temperature of from about 2° to about 80° F., lower than that to which the reaction mixture is desired to be cooled thereby. The relative amount of sulfonic acid employed to effect the desired cooling at such temperatures usually is such as to provide a weight ratio of said cooling mass to said reaction mixture in the range of from about 4:1 to about 50:1.

Any suitable expedient means can be utilized to effect the quench cooling of the reaction mixture in the cooling zone. For example, either or both of the reaction mixture and the sulfonic acid cooling mass may be introduced into the cooling zone as a spray to effect the requisite mixing of the two streams. The reaction mass also suitably may be introduced as a jetted stream into a mass of the sulfonic acid. In the preferred method, a stream of the cooled, recycled acid impinges against the liquid film at the bottom of the reactor to effect the near instantaneous cooling of the reaction mixture.

In embodiments of the invention wherein the cooling step is carried out in a heat exchanger, the heat exchanger is characterized by a sufficiently large cooling surface to effect the requisite cooling of the reaction mixture. When water-cooled heat exchangers are employed for this purpose, it is preferred that the temperature of the cooling water be less than about 85° F.

The residence time of the reaction mixture in the cooling zone in accordance with the present invention usually, and preferably, is only on the order of magniture of 2 to 4 minutes. In preferred embodiments of the present invention, the reaction mixture then is immediately withdrawn from the cooling zone and passed to a separation zone to effect the removal of the inert diluent and traces of unreacted sulfur trioxide. This separation may be effected by any expedient means known to the art for rapidly separating gases from liquids, such as those involving centrifuging and related techniques. A cyclone separator is the preferred separation means.

The velocity of the sulfonic acid product as it leaves the cooling zone and is conveyed to the cyclone separator is a factor of importance. If the velocity is too low, some liquid separates out on the wall of the pipes. If liquid remains on the pipe walls or moves slowly, the small amount of residual sulfur trioxide in the off-gas repeatedly contacts this material and may in time cause charring or burning of the product. The same effect is true in the cyclone separator itself. If only a small amount of liquid contacts portions of its surfaces and is not washed into the bottom of the cyclone regularly, a considerable amount of darkening takes place. Then if the liquid in the cyclone rises and this material is washed off the walls, degradation of the good product occurs by this addition of dark material. The cyclone separator should be designed in such a way that all of its working surfaces are continually washed with large quantities of product sulfonic acid. If dead spaces are present in the cyclone, it is necessary to recycle a little acid over these areas to keep them continually washed. It has been found that velocities of about 50 feet per second are necessary to keep the product sulfonic acid from settling out on the pipe walls. For this reason it is desirable to have the cooling tank and the acid separator close together in order to eliminate as much pipe area as possible.

In embodiments of the invention wherein the organic reactant is free of alcoholic hydroxyl groups, a liquid stream rich in product sulfonic acid is removed from the gas separation zone.. At least a portion of this stream is passed directly to a digestion zone where it is maintained while being mixed for a time period so that additional reaction of ingredients in the resultant sulfur trioxide-free mixture may take place. As described below, while all of the liquid stream removed from the gas separation zone suitably may be passed to the digestion zone, the invention contemplates embodiments wherein a quench cooling technique is employed in the above described cooling step. Thus, a portion of the liquid stream is suitably cooled and recycled as at least a portion of the sulfonic acid coolant liquid mass introduced into the quench cooling zone.

The sulfonic acid-containing liquid obtained from the gas separation zone is maintained with cooling in the digester at a temperature sufficiently low to preclude degradation of the acid product, but sufficiently high to allow the reaction to proceed to near completion. The maximum temperature usually employed is about 135° F. The preferred digestion temperature is between about 120 and 125° F. The effect of digestion is to lower the inorganic salt content of the neutralized product as well as to reduce its free oil content. The reactions which take place during the digestion of the sulfonic acid-containing mixture are relatively complex and include the reaction of sulfonic anhydrides which are formed during sulfonation with some of the unreacted hydrocarbon. If left undigested, subsequent water addition to the anhydride-containing material breaks down the anhydride to form an organic sulfonic acid and sulfuric acid, the latter of which forms undesirable sodium sulfate upon neutralization of the product mixture. Although practically all of the sulfur trioxide is absorbed in the reactor, only about 92 to 96% of the alkyl benzene is converted to sulfonic acid, and about 1 to 4% conversion takes place in the product cooler before the sulfur trioxide gas is separated. The final 0.5 to 1.5% of the reaction takes place in the digester. The majority of the anhydride breaks down immediately in the cooling tank, and the rest at a reduced rate in the digester. If a digestion temperature of about 135° F. is employed, there will be a somewhat lower sulfate and free oil content in the final product, but the product color will also be inferior. The optimum degree of digestion, or the length of time necessary for complete digestion, is determined on the basis of the characteristics of each material to be sulfonated. In preferred embodiments of the invention, particularly when an alkyl benzene is employed as the organic reactant, the digestion time is below about 30 minutes, usually from about 1 to about 30 minutes.

The reaction in the digester is effected much more rapidly if vigorous mixing is employed. The reason for this is that diffusion of the viscous sulfonic acid solution is extremely slow and thereby controls the rate of reaction. When diffusion is aided by agitation, the rate at which the reaction takes place increases considerably.

It is also important that during digestion the portion of digested material leaving the digester is not back-mixed with the undigested material just entering the digester. Such back-mixing would reduce significantly the reaction rate attained in the digester.

The addition of a sulfonatable reactant including, without limitation, alcohols such as fatty alcohols, as well as benzene, toluene or xylene, in amounts approximately equivalent to the anhydride content of the reaction mixture, e.g., from about 1 to about 2% by weight based on the originally entering organic reactant, in the last stage of the digestion step will further cut down the inorganic salt content of the final product by its reaction with the anhydrides to form corresponding organic sulfates and/or sulfonates. A final water addition also may be employed in order to completely break down all of the remaining anhydrides.

In embodiments of the present invention wherein the organic reactant contains an alcoholic hydroxyl group, a liquid stream containing an organic sulfuric acid is recovered from the gas separation zone, the digestion step usually is bypassed and the liquid stream immediately is neutralized. If such a liquid product is passed to a digestion step, the period of time it remains in the digester should be relatively short.

There is a particular instance when it is desirable to digest sulfuric acid products obtained in accordance with the present invention. When a fatty alcohol, preferably having from about 8 to about 20 carbon atoms, is sulfonated, the resultant sulfate-containing mixture may be digested in a digestion zone together with a sulfonated alkyl benzene prepared in a parallel reaction zone. As stated above, fatty alcohols tend to degrade rapidly in color when an excess of sulfur trioxide is utilized to effect their complete sulfonation. By completing the sulfonation of the fatty alcohol in the presence of the sulfonated alkyl benzene which contains sulfonic acid anhydrides, a final product having both good color and a low level of unreacted oil is obtained.

A more detailed description of the apparatus and processes of the present invention will be given with reference to the accompanying drawings in which:

FIGURE 6 is a flow diagram illustrating the co-sulfation of a fatty alcohol and an alkyl benzene.

Like reference numerals indicate like parts throughout the several views of the drawings.

Figure 1:
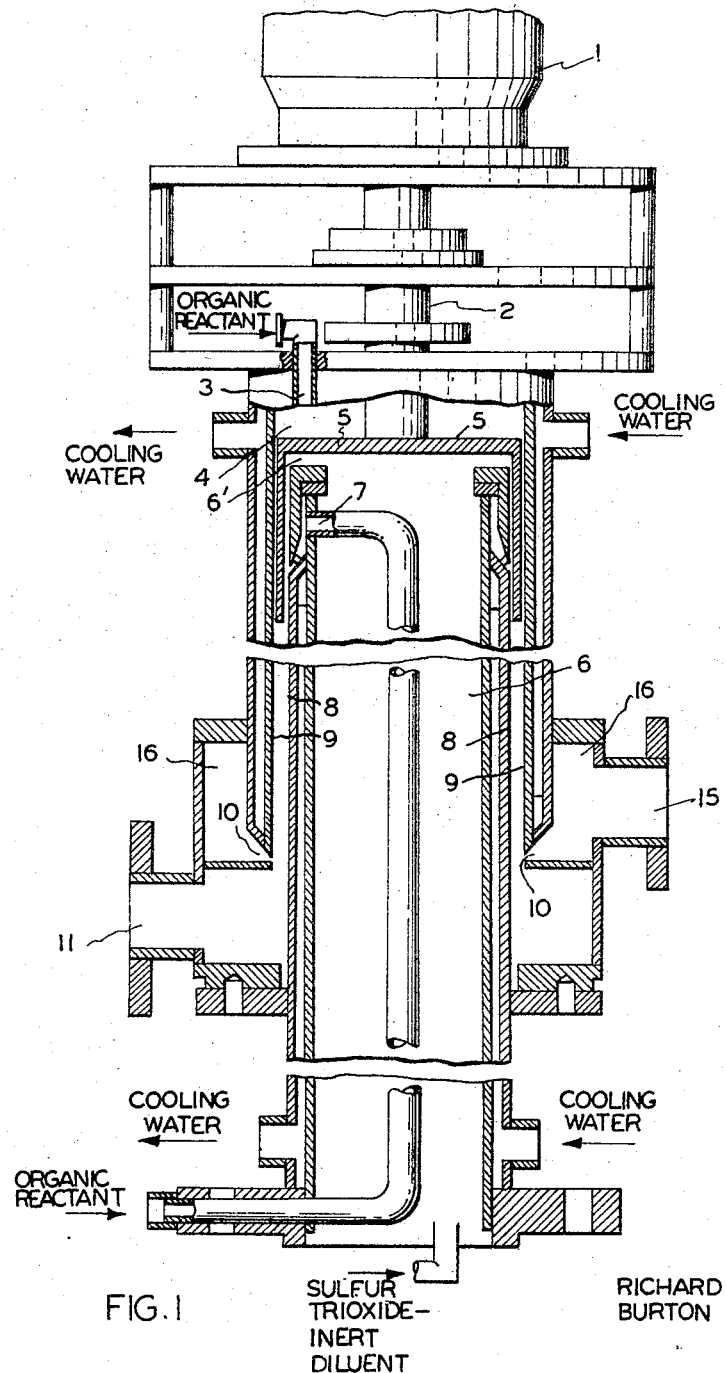
FIGURE 1 is a sectional view illustrating a novel gas-liquid reactor useful in carrying out the processes of this invention.

With specific reference to FIGURE 1, this figure illustrates the novel reactor or gas-liquid treating device according to the present invention. In accordance with this invention, a portion of the liquid reactant enters the reactor through inlet 3 and another portion through inlet 7 and is passed to the space between the rotor 5 and the inner and outer reaction surfaces 8 and 9, respectively. The gaseous reactant is passed to the space between rotor 5 and reaction surface 8 from chamber 6 through inlet 6'. The rotor and the feed of reactants will be shown in detail in subsequent figures.

Figure 2:
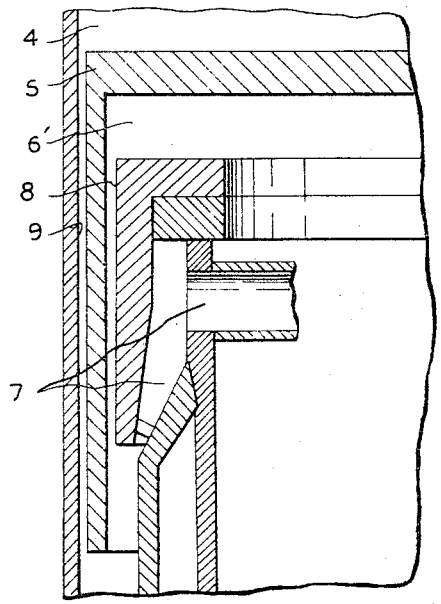
FIGURE 2 is a detailed view of a portion of the reactor illustrated in FIGURE 1.

As clearly shown in FIGURES 1 and 2, the rotor 5 extends into only a portion of the space between the two concentric reaction surfaces 8 and 9. It will be appreciated that almost all of the reaction and/or mixing of the gaseous and liquid reactants takes place in this limited space. Power for rotation of the rotor 5 is provided by means of shaft 2, operatively connected to and driven by a conventional motor 1.

The two circular and concentric reaction surfaces 8 and 9 extend beyond the lower portion of rotor 5 as clearly shown in FIGURE 1. Each reaction surface is water-cooled along its entire length as indicated in the figure. Suitable baffle plates promote the circulation of cooling water from each inlet to the corresponding outlet. The space between the two reaction surfaces enlarges into a collection chamber and product removal outlet 11. Just before the reaction product passes to the chamber 11 there is provided an inlet 10 for cooled recycled reaction product when used for quenching the reaction mixture. The cooled reaction product may be returned to the system through inlet 15 and passed to inlet 10 through distribution ring 16.

FIGURE 2 shows feeding of the liquid and gaseous reactants to the reactor and specifically to the spaces between rotor 5 and reaction surfaces 8 and 9. The liquid reactant fed from above enters the space between the outer reaction surface 9 and rotor 5 at the upper and outer edge of the rotor indicated as 4 and passes downward through the reactor. The gaseous reactant enters the space between rotor 5 and the inner reaction surface 8 under the inner edge of the rotor indicated as 6' and passes in a direction parallel to that of the liquid reactant. Rotation of the rotor and the action of the flowing gas stream cause mixing of the liquid and gaseous reactants and distribution of the liquid reactants and reaction mixture to both reaction surfaces 8 and 9.

As also shown in FIGURE 2, additional liquid reactant entering from the bottom of the reactor is passed from inlet 7 to reaction surface 8, and passes parallel to the general flow of reactants. Mixing of the gaseous and liquid reactants and distribution and redistribution of the reaction mixture to both reaction surfaces occurs as described in the previous paragraph. The distance between the inner and outer reaction surfaces 8 and 9 is from one-eighth to one-half inch. Rotor 5 has a clearance from each of these reaction surfaces of five to forty thousandths (.005 to .040) on an inch.

Figure 3:
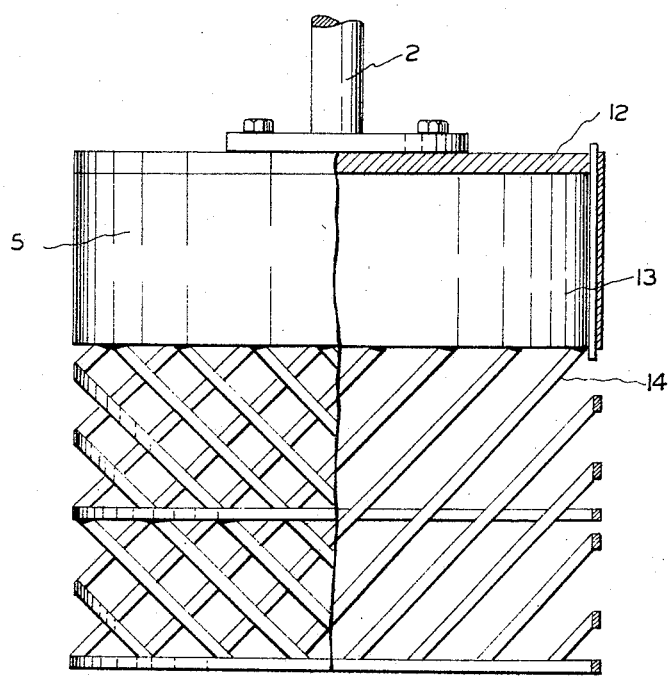
FIGURE 3 is a detailed view of the rotor used in the reactor illustrated in FIGURE 1.

FIGURE 3 shows a typical rotor assembly in detail. The rotor 5 is driven or turned by means of shaft 2 which is connected to a motor or other source of rotatory power. The rotor has a cap 12, a short solid skirt 13 and an open network of veins 14 inclined at an angle of about 45° from the vertical.

Figure 4:
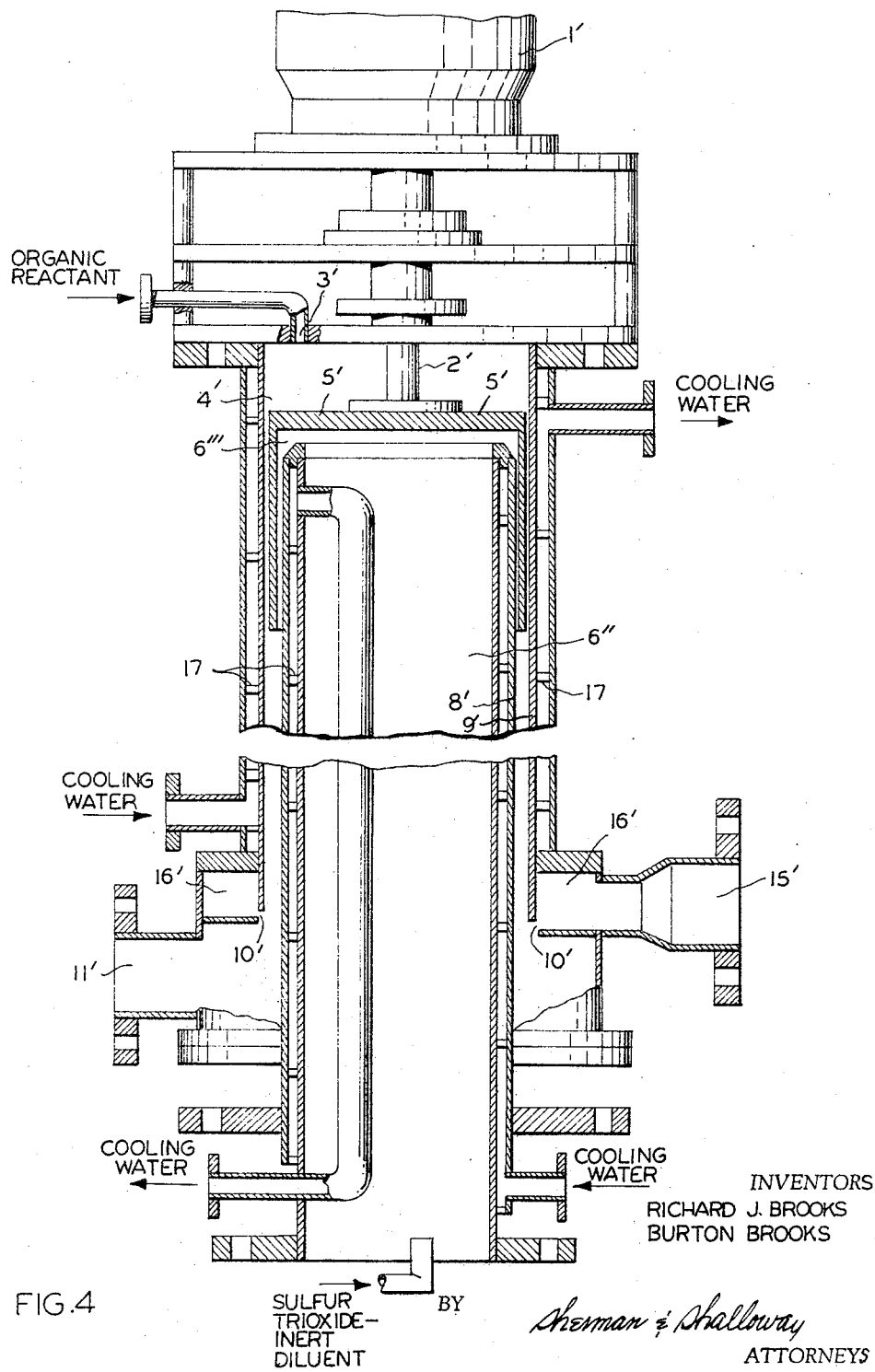
FIGURE 4 is a sectional view illustrating another novel gas-liquid reactor useful in carrying out the processes of this invention.

FIGURE 4 illustrates another novel reactor or gas-liquid treating device according to the present invention. In this reactor, all of the liquid reactant enters through inlet 3' and a portion is passed to the space between the rotor 5' and the outer reaction surface 9'. The remainder passes through holes (not shown) drilled through the rotor or tubes (not shown) fastened to the rotor and contacts the inner reaction surface 8' at the bottom of the solid skirt of the rotor. Also, as illustrated in FIGURE 2, the gaseous reactant is passed to a portion of the space between the rotor 5' and the inner reaction surface 8' from chamber 6" through inlet 6'''.

As in the reactor shown in FIGURE 1, the rotor 5' extends into only a portion of the space between the two concentric reaction surfaces 8' and 9' and power for rotation of the rotor 5' is provided by means of shaft 2' operatively connected to and driven by a conventional motor 1'. The two circular and concentric reaction surfaces 8' and 9' extend beyond the lower portion of rotor 5' and are water-cooled along their entire lengths. The cooling is provided by means of separate jackets containing circulating cooling water. A plurality of baffle plates 17 is present in each jacket to provide more efficient distribution of the circulating cooling water, thereby providing more efficient cooling and a more uniform temperature in the reaction zone.

The space between the two reaction surfaces enlarges into a collection chamber and product removal outlet 11'. When the reaction product is to be quench-cooled as it enters collection chamber 11', there is provided an inlet 10' from which is added cooled recycled reaction product. This cooled reaction product is returned to the reactor through inlet 15' after being externally cooled to a suitable temperautre by any conventional means. The recycled product is passed from inlet 15' to distribution ring 16' for continuous addition to chamber 11' through inlet 10'.

Figure 5:
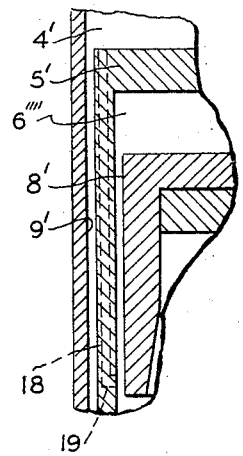
FIGURE 5 is a detailed view of the rotor used in the reactor illustrated in FIGURE 4.

FIGURE 5 shows feeding of the liquid and gaseous reactants to the reactor and specifically to the spaces between rotor 5' and reaction surfaces 8' and 9'. The liquid reactant is fed from above and a portion thereof enters the space between outer reaction surface 9 and rotor 5' at the upper and outer edge of the rotor indicated as 4' and passes downward through the reactor. The gaseous reactant enters the space between rotor 5' and the inner reaction surface 8' under the inner edge of the rotor indicated as 6'''' and passes in a direction parallel to that of the liquid reactant. Rotation of the rotor and the action of the flowing gas stream cause mixing of the liquid and gaseous reactants and distribution of the liquid reactants and reaction mixture to both reaction surfaces 8' and 9'.

As also shown in FIGURE 5, a portion of the liqiud reactant entering at the space indicated as 4' passes downward through a tube 18 in the solid skirt of rotor 5' in a direction parallel to that of the other portion of liquid reactant and parallel to that of the flowing gas stream. Tube 18 terminates near the bottom of the solid skirt of the rotor and before the veined portion of the rotor. A short vent 19 through rotor 5' allows passage of the liquid reactant from the terminus of tube 18 to the space between rotor 5' and inner reaction surface 8'. The liquid reactant continues to pass downward in a direction parallel to that of the flowing gas stream. Rotations of the rotor and the action of the flowing gas stream cause mixing of both liquid reactant streams and the gaseous reactant and distribution of the liquid reactants and reaction mixture to both the inner and outer reaction surfaces 8' and 9' again results.

FIGURE 6 illustrates the co-sulfation of a fatty alcohol and an alkyl benzene. The sulfation of the fatty alcohol is carried out using a mole ratio of sulfur trioxide to alcohol of about 0.85:1 to about 1:1, and the sulfonation of the alkyl benzene is conducted utilizing an excess of sulfur trioxide, preferably in an amount corresponding to a mole ratio of sulfur trioxide to alkyl benzene of from about 1.05:1 to about 1.15:1. The two reaction streams are each separately and rapidly cooled, then separated from excess sulfur trioxide. The sulfonated alkyl benzene product is digested in the usual manner and then mixed with the fatty alcohol sulfate ester in the quench-recycle system at the end of the fatty alcohol sulfation. Usually the fatty alcohol and alkyl benzene reaction mixtures are mixed for digestion in approximately equal mole proportions but any mixing ratio suitably may be employed. The combined sulfated-sulfonated product is then passed to a neutralization zone wherein it is reacted with the requisite amount of an alkali such as an aqueous solution of sodium hydroxide in accordance with conventional neutralization techniques to provide the corresponding sulfonate salt in the form of a substantially completely sulfonated product.

A similar technique has been applied to the sulfation of nonyl phenol ethoxylate. In sulfating nonyl phenol ethoxylate, it is possible to have true sulfation; but it is also possible to sulfonate the ring of the compound. It has been found that an improved product is produced when the technique just described for co-sulfating a fatty alcohol and an alkyl benzene is used. The alkyl benzene sulfonate anhydride is capable of sulfating the nonyl phenol ethoxylate in a manner which is less severe than if it is done with sulfur trioxide itself. Using this system, it is possible to reduce the unsulfated portion of the nonyl phenol ethoxylate by several percent while not substantially increasing the ring sulfonate content.

The invention is further illustrated by the following examples:

EXAMPLE 1

This example illustrates a sulfonation process using the apparatus such as illustrated in the drawings. The space between the inner and outer reaction surfaces is 7/32 of an inch. The rotor clears the outer reaction surface by 0.010 of an inch and the inner reaction zone by 0.020 of an inch. The solid core of the rotor is three inches in length and the open or veined portion of the rotor is 9 inches in length. The rotor turns at a speed of about 1,750 r.p.m. in a direction opposite to that of the veins which are inclined at an angle of 45° from the axis of the rotor. The over-all length of the reactor is 3 feet, and a 6 inch quench-cooling zone is present at the end of the reactor.

Six pounds per minute of dodecyl benzene at 70° F. are fed to the reactor, three pounds per minute to each reaction surface. The mole ratio of sulfur trioxide to alkyl benzene employed is 1.08 to 1.0. The sulfur trioxide is provide in a 5% concentration admixed with air and enters the reactor at a temperature of about 100° F. and at a pressure of 12 pounds per square inch. Travelling at a normal gas velocity of about 250–260 feet per second, the gas mixture leaves the reactor at about 180° F. The cooling water supplied to the reactor is at about 85° F. and that supplied to the quench-cooling heat exchanger is at about 80° F.

The resultant reaction mixture is quenched with product sulfonic acid recycling at a temperature of 110° F. The mixture of gas consisting essentially of air with sulfonic acid and small traces of sulfur trioxide and dodecyl benzene leaves the quench tank and passes to the cyclone at a temperature of about 120° F. After separating the product sulfonic acid from the residual gas, the sulfonic acid is digested at a temperature of 120° F. with severe agitation in a compartmented digester eliminating any possibility of back-mixing. After a fifteen minute digestion period, the product sulfonic acid is subjected to treatment with from one to three percent by weight of water and mixed with the water for about five minutes. After the water treatment, the product sulfonic acid is passed to the neutralizer where it is neutralized with caustic soda, ammonia or any other common neutralizing agent. If desired, the dodecyl benzene sulfonic acid can be separated at the end of the hydration cycle without neutralization.

The neutralized product has the following analysis:

Petroleum ether extract (active basis) ___percent__ 1.4
Color, Klett (using a 5% solution 40 mm. path) __ 50.0
Alcohol insoluble (active basis) _____percent__ 2.5

EXAMPLE 2

This example illustrates a sulfation process using the apparatus of the present invention. The apparatus employed is the same as was used in Example 1 with the exception that the digestion and hydration steps are eliminated. Lauryl alcohol containing about 85% $C_{12}$ alcohol, the balance being substantially $C_{14}$ alcohol, is the material sulfated. Three pounds per minute of lauryl alcohol are fed to the inner reaction surface and two pounds per minute are fed to the outer reaction surface. The sulfur trioxide-air mixture enters at a temperature of 95° F., at a pressure of 10 p.s.i.g. and a concentration of 4% sulfur trioxide. The gas velocity is about 250 feet per second and the mole ratio of sulfur trioxide to lauryl alcohol is 1.04 to 1.0. The lauryl alcohol is fed to each reaction surface at a temperature of about 80° F. The cooling water temperature to the reactor is about 88° F. and the cooling water temperature to the quench-cooling heat exchanger is about 75° F.

After passing through the reaction zone, the resultant lauryl alcohol sulfate is immediately contacted with a substantial excess of cooled, recycled product acid at a temperature of 80° F. The quenched reaction mixture and excess air leaves the quench tank at a temperature of about 90° F. Because of the reversible nature of the reaction, the mixture is separated in the cyclone and passed directly to the neutralizer without additional digestion.

This product has the following analysis:

Petroleum ether extract (active basis) ___percent__ 1.5
Color, Klett (using a 5% solution 40 mm. path) __ 25.0
Alcohol insoluble (active basis) _____percent__ 0.8

EXAMPLE 3

In this example, an alkyl benzene and a tallow alcohol are sulfonated separately in individual reactors and then mixed together prior to neutralization. This results in a portion of the anhydride content of the alkyl benzene sulfonic acid reacting with unreacted tallow alcohol to produce tallow alcohol sulfate. A more complete reaction takes place with the tallow alcohol having a better color than if each material were sulfated or sulfonated separately and then post-blended.

Five pounds per minute of the alkyl benzene are fed to the first reactor and five pounds per minute of the tallow alcohol are fed to the second reactor. The tallow alcohol contains about 60% $C_{18}$ alcohol and 40% $C_{16}$ alcohol; the alkyl benzene has from 8 to 18 carbon atoms, with a nominal value of 13 carbon atoms in the side chain. The mole ratio of sulfur trioxide to alkyl benzene in the first reactor is about 1.10 to 1 and the mole ratio of sulfur trioxide to tallow alcohol in the second reactor is about 0.98 to 1.0. The concentration of the sulfur trioxide in each gas stream is about 4% and the gas stream enters each reactor at a pressure of about 12 pounds per square inch. The gas stream enters the alkyl benzene reactor at 100° F. and the tallow reactor at 130° F. The alkyl benzene feed enters at a temperature of 70° F. and the tallow alcohol feed enters at a temperature of 125° F. Two and one-half pounds per minute of the alkyl benzene are fed to each of the inner and outer reaction surfaces, whereas with the tallow alcohol three pounds per minute are fed to the inner reaction surface and two pounds per minute are fed to the outer reaction surface. The cooling water temperature to the alkyl benzene reactor is 85° F. and the cooling water temperature to the quench-cooling heat exchanger is 80° F. The cooling water temperature to the tallow alcohol reactor is 130° F. and to the tallow alcohol quench-cooling heat exchanger is 115° F.

After passing through the reactor, the product alkyl benzene sulfonic acid is contacted with a large excess of cooled recycled acid at a temperature of 110° F. and it leaves the quenching system along with the remaining air at a temperature of 120° F. It is then separated from the excess air in a cyclone separator and passed to a digester where it is digested for 15 minutes. Following the fifteen minute digestion time, it is then passed to the recycle system of the tallow alcohol reactor at a temperature of about 125° F. where it contacts the fresh sulfated tallow alcohol. The mixture of the two products is recycled through a heat exchanger and leaves the cooling system at a temperature of about 105° F. The mixed acids are then passed to a cyclone separator and after separation they are fed directly to a neutralizer. The combined neutralized product has the following analysis:

Petroleum ether extract (active basis) ___percent__ 3.2
Color, Klett (5% solution 40 mm. path) _____ 50.0
Alcohol insoluble (active basis) _____percent__ 2.0

EXAMPLE 4

In this example six pounds per minute of an ethoxylated lauryl alcohol are sulfated in the same equipment as described in Example 2. The alcohol ethoxylate consists primarily of an 87% $C_{12}$ alcohol with the remainder being essentially $C_{14}$ alcohol, to which three moles of ethylene oxide have been added per mole of alcohol. The ethoxylated alcohol is fed to the reactor at a temperature of 85° F. and the cooling water at 90° F. The sulfur trioxide-air mixture contains 3.5% sulfur trioxide and about a 4 mole percent excess enters at a temperature of 110° F. and at a pressure of 10 p.s.i.g. The product ethoxylated lauryl alcohol sulfuric acid leaves the reactor at a temperature of about 170° F. and is immediately cooled in the quench tank to 90° F. After neutralization with caustic soda the product has the following analysis:

Unreacted alcohol ethoxylate (active
 basis) _____percent__ 1.0
Ratio of active ingredient to sodium sulfate _____ 99/1
Color, Klett as the product left reactor (using 5%
 solution and 40 mm. path) _____ 25.0

EXAMPLE 5

In this example a secondary ethoxylated lauryl alcohol (predominantly a mixture of $C_{12}$ and $C_{14}$ alcohols) containing three moles of ethylene oxide per mole of alcohol is sulfated in the same reactor and under the same conditions as Example 4, the only difference being that five parts of recycled sulfuric acid product are mixed with each part of alcohol ethoxylate reactant and the alcohol ethoxylate reactant is also diluted with 20% by weight of an inert solvent. Recycled product is pumped from the bottom of the cooling tank and mixed with the incoming alcohol ethoxylate before it enters the reactor. All other conditions of the reactor are essentially the same. The final product after neutralization with caustic soda has a performance about the same in detergent formulations as does the product of Example 4 or similar primary alcohol ethoxylate products.

EXAMPLE 6

This example illustrates the use of a modification of the apparatus of the present invention for the absorption of a gas by a liquid. The use of the apparatus as described in the drawings, but with the rotor removed, unexpectedly provides a general system wherein a gas is efficiently absorbed by a liquid travelling in the same direction.

This example illustrates the continuous absorption of gaseous sulfur trioxide by means of concentrated sulfuric acid. About 10-15 gallons per minute of 98% sulfuric acid are passed to a reactor having one-quarter inch between the two reactor surfaces and having the rotor removed. Three pounds per minute of sulfur trioxide in a gas-air mixture containing 4% by volume of sulfur trioxide are passed to the apparatus concurrently with the acid absorbent. The pressure drop through the three-foot long reactor is 8 to 10 pounds. The absorber temperature of 80-100° F. is maintained by recycling sulfuric acid from the bottom of the absorber through a heat exchanger before returning it to the top of the absorption column.

The apparatus used in this example can be used to absorb various gases, alone or in dilution, by means of the appropriate liquid absorbent. For example, carbon dioxide or other acid gases can be absorbed by alkaline solutions, ammonia or other alkaline gases can be absorbed by acidic solutions, butane by hydrocarbon solvents, etc.

It is to be understood that the foregoing detailed description is given merely by way of illustration and that many variations may be made therein without departing from the spirit of this invention. Accordingly, this invention is not to be limited except within the scope of the appended claims.

What is claimed is:

1. A continuous process for sulfonating a sulfonatable organic reactant selected from the group consisting of olefins, aromatic hydrocarbons, unsaturated fatty acids and compounds having an alcoholic hydroxyl wherein said organic reactant is reacted with sulfur trioxide to provide a corresponding sulfonic acid which comprises passing parallel streams of said organic reactant and a mixture of sulfur trioxide and a gaseous-inert diluent into a reaction zone wherein no pre-recation takes place between said stream of organic reactant and said stream of sulfur trioxide-gaseous inert diluent prior to entry into said reaction zone, and thoroughly mixing said organic reactant and said sulfur trioxide gaseous-inert diluent in said reaction zone for a time period of at most about ten seconds and rapidly cooling the resultant reaction mixture as it passes from the reaction zone, said reaction zone consisting of two externally cooled, substantially concentric, circular reaction surfaces and having a concentrically located rotor turning therein, the clearance between the said rotor and the said reaction surfaces being five to forty thousandths of an inch.

2. The continuous process for sulfonating a sulfonatable organic reactant selected from the group consisting of olefins, aromatic hydrocarbons, unsaturated fatty acids and compounds having an alcoholic hydroxyl wherein said organic reactant is reacted with sulfur trioxide to provide a corresponding sulfonic acid, which comprises passing parallel streams of said organic reactant and a mixture of sulfur trioxide and a gaseous-inert diluent into a reaction zone, wherein no pre-reaction takes place between said stream of organic reactants and said stream of sulfur trioxide and gaseous-inert diluent prior to entry into said reaction zone, and thoroughly mixing said organic reactant and said sulfur trioxide and gaseous-inert diluent in said reaction zone for a time period of at most about ten seconds and rapidly cooling the resultant reaction mixture as it passes from the reaction zone, said reaction zone consisting of two externally cooled, substantially concentric, circular reaction surfaces and having a concentrically located rotor turning therein, said rotor extending into only a portion of the space between said reaction surfaces, the space between the said reaction surfaces being one-eighth to one-half inch and the clearance between said rotor and the said reaction surfaces being five to forty-thousandths of an inch.

3. The process according to claim 2 wherein said mixture of sulfur trioxide and said gaseous inert diluent is introduced into said reaction zone at a velocity of at least 75 feet per second.

4. The process according to claim 2 wherein said cooling of said reaction mixture withdrawn from said reaction zone is carried out by contacting and mixing said reaction mixtures in said cooling zone with a cool mass of sulfonic acid.

5. The process according to claim 2 wherein a plurality of reaction zones is employed, said reaction zones being in series relationship.

6. The process according to claim 2 wherein, subsequent to said cooling of said reaction mixture, said sulfonic acid-rich mixture is withdrawn from said cooling zone, said inert diluent and unreacted sulfur trioxide is separated therefrom, and at least a part of the resulting mixture is digested in an agitated digestion zone without substantial back mixing to provide a product richer in sulfonic acid than that entering the said digestion zone.

7. The process according to claim 6 wherein during said digestion step a sulfonatable organic reactant is added to said sulfonic acid-rich mixture in said digestion zone and at the end of said digestion time period, the resultant sulfonic acid product is neutralized.

8. A process according to claim 6 wherein the gas velocity between the cooling zone and the separator is at least 50 feet per second, and wherein all the surfaces of the separator are wetted by the sulfonic acid.

9. The process according to claim 2 wherein said organic reactant is introduced into said reaction zone between the rotor and the outer reaction surface and between the rotor and the inner reaction surface.

10. The process according to claim 9 wherein some inert diluent gas is fed with the organic reactant as the same enters the reaction zone to increase its velocity.

11. The process according to claim 2 wherein a plurality of reaction zones is employed, said reaction zones being in parallel relationship.

12. The process of claim 11 wherein the reaction mixture passes into a common cooling zone.

13. The continuous process for sulfonating a sulfonatable organic reactant selected from the group consisting of olefins, aromatic hydrocarbons, unsaturated fatty acids and compounds having an alcoholic hydroxyl wherein said organic reactant is reacted with sulfur trioxide to provide a corresponding sulfonic acid which comprises passing parallel streams of said organic reactant and a mixture of sulfur trioxide and a gaseous inert diluent into a reaction zone wherein no pre-reaction takes place between said stream of organic reactant and said stream of sulfur trioxide gaseous inert diluent prior to entry into the reaction zone and thoroughly mixing said organic reactant and said sulfur trioxide gaseous inert diluent in said reaction zone for a time period of at most about 10 seconds and rapidly cooling the resultant reaction mixture as it passes from the reaction zone, said reaction zone consisting of two externally cooled, substantially concentric, circular reaction surfaces with the space between the two said reaction surfaces being one-eighth to one-half inch.

14. The process according to claim 13 wherein, subsequent to said cooling of said reaction mixture, said sulfonic acid-rich mixture is withdrawn from said cooling zone, said inert diluent and unreacted sulfur trioxide is separated therefrom and at least a part of the resulting mixture is digested in an agitated digestion zone without substantial back mixing to provide a product richer in sulfuric acid than that entering the said digestion zone.

15. The process according to claim 14 wherein during the digestive step, a sulfonatable organic reactant is added to said sulfonic acid-rich mixture in said digestion zone and at the end of said digestion time period, the resulting sulfonic acid products is neutralized.

16. A process according to claim 14 wherein the gas velocity between the cooling zone and the separator is at least 50 feet per second, and wherein all of the surfaces of the separator are wetted by the sulfonic acid.

17. The process for the co-sulfonation of a fatty alcohol and an alkyl benzene which comprises the steps of independently sulfonating the fatty alcohol and the alkyl benzene in two separate reaction zones wherein the mol ratio of sulfur trioxide to fatty alcohol is about 0.85:1 to about 1.1 and wherein the mol ratio of sulfur trioxide to alkyl benzene is about 1.05:1 to about 1.15:1, rapidly cooling the resulting reaction mixtures as they pass from the separate reaction zones, separating the sulfonated alkyl benzene and thereafter digesting the same, adding the digested alkyl benzene sulfonate to the cooling system for the fatty alcohol, separating the mixed acids and neutralizing the resulting mixture.

18. The process according to claim 17 wherein the fatty alcohol is an ethoxylated fatty alcohol.

References Cited

UNITED STATES PATENTS

| | | |
|---|---|---|
| 1,498,168 | 6/1924 | Hill. |
| 2,187,244 | 1/1940 | Mills. |
| 2,190,136 | 2/1940 | Oberg. |
| 2,240,935 | 5/1941 | Lepin. |
| 2,290,167 | 7/1942 | Datin. |
| 2,492,706 | 12/1949 | McCann et al. |
| 2,697,031 | 12/1954 | Hervert. |
| 2,923,728 | 2/1960 | Falk et al. |
| 2,691,040 | 10/1954 | Bloch et al. |
| 2,830,081 | 4/1958 | Van Scoy. |
| 2,931,822 | 4/1960 | Tischbriek. |
| 3,058,920 | 10/1962 | Brooks et al. |
| 3,200,140 | 8/1965 | Sowerby. |
| Re. 23,774 | 1/1954 | Stoneman. |

FLOYD D. HIGEL, *Primary Examiner.*

U.S. Cl. X.R.

23—283, 284, 290.5; 260—400, 457, 459, 460, 505, 686